United States Patent [19]

Finke

[11] Patent Number: 4,800,866
[45] Date of Patent: Jan. 31, 1989

[54] LOW NOX RADIANT TUBE BURNER AND METHOD

[75] Inventor: Harry P. Finke, Pittsburgh, Pa.

[73] Assignee: Bloom Engineering Company, Inc., Pittsburgh, Pa.

[21] Appl. No.: 237,645

[22] Filed: Aug. 26, 1988

Related U.S. Application Data

[63] Continuation of Ser. No. 25,365, Mar. 13, 1987, abandoned.

[51] Int. Cl.⁴ .............................................. F24C 3/00
[52] U.S. Cl. .................................. 126/91 A; 432/209; 431/351
[58] Field of Search ............... 126/91 A, 91 R; 432/233, 209; 431/353, 9, 215

[56] References Cited

U.S. PATENT DOCUMENTS

| | | | |
|---|---|---|---|
| 2,188,133 | 1/1940 | Hepburn | 431/353 |
| 4,077,761 | 3/1978 | Dollinger et al. | 431/353 |
| 4,218,211 | 8/1980 | Caplan | 126/91 A |
| 4,467,779 | 8/1984 | Kreinin et al. | 126/91 A |
| 4,601,655 | 7/1986 | Riley et al. | 431/116 |
| 4,619,604 | 10/1986 | Pickering | 126/91 A |

FOREIGN PATENT DOCUMENTS

| | | | |
|---|---|---|---|
| 69932 | 6/1978 | Japan | 126/91 A |
| 12904 | 2/1981 | Japan | 126/91 A |
| 16107 | 1/1983 | Japan | 126/91 A |
| 926429 | 5/1982 | U.S.S.R. | 126/91 A |

Primary Examiner—James C. Yeung
Attorney, Agent, or Firm—Webb, Burden, Ziesenheim & Webb

[57] ABSTRACT

The radiant tube burner assembly comprises a radiant tube having a burner leg and an exhaust leg. A plenum for mixing combustion air and products of combustion from the exhaust leg is positioned to direct the resultant mixture into the burner leg. A jet pump for directing high velocity combustion air through a nozzle and along a central longitudinal axis of the plenum aspirates the products of combustion from the exhaust leg through a duct in registry with the plenum and the exhaust leg. A restricted orifice associated with the duct is dimensioned and sized in relation to the jet pump nozzle to control the amount of products of combustion aspirated to the plenum. A conventional fuel source including a fuel pipe and conventional exhaust means also form a part of the assembly.

13 Claims, 4 Drawing Sheets

LOW NOX RADIANT TUBE BURNER AND METHOD

This is a continuation of co-pending application Ser. No. 025,365, filed on Mar. 13, 1987, abandoned.

FIELD OF THE INVENTION

My invention is directed to radiant tube burners and assemblies and more particularly to radiant tube burners and assemblies having Low NOX emissions and the method of achieving such emissions.

DESCRIPTION OF THE PRIOR ART

The need to minimize the formation of oxides of nitrogen during combustion has become a requirement of many applications of fire heaters, boilers, oil field steamers, and the like. That requirement has also now become a reality for heat treating furnaces and other applications which utilize radiant tubes and burners as the heat source for the processing to be carried out.

It is known that there are two basic sources of NOX formation, mainly from the nitrogen in the air and further from the fuel bound nitrogen. The probable use of newly available synfuels which contain large amounts of combined nitrogen as well as the increase in the need to conserve energy further increases the demand for Low NOX emissions.

Various forms of staged combustion and lower flame temperatures have been employed with conventional burners to reduce NOX emissions. The need remains for a radiant tube burner and assembly which will reduce the NOX emissions from radiant tube furnace applications.

SUMMARY OF THE INVENTION

My invention provides a radiant tube burner and assembly which reduces NOX emissions to acceptable levels. In addition my invention provides a more uniform heating of the radiant tubes so as to provide minimum variation of temperature along the radiant tube. This also results in improved cycle efficiency and lower fuel costs. My invention can be used with cold radiant tube systems or with systems which employ a recuperator to preheat the combustion air.

My radiant tube burner assembly comprises a radiant tube having a burner leg and an exhaust leg. A plenum for mixing combustion air and products of combustion from the exhaust leg is positioned to direct the resultant mixture into the burner leg. A jet pump for directing high velocity combustion air through a nozzle and along a central longitudinal axis of the plenum aspirates the products of combustion from the exhaust leg through a duct in registry with the plenum and the exhaust leg. A restricted orifice associated with the duct is dimensioned and sized in relation to the jet pump nozzle to control the amount of products of combustion aspirated to the plenum. A conventional fuel source including a fuel pipe and conventional exhaust means also form a part of my assembly.

In the preferred form the radiant tube and burner assembly includes a recuperator positioned in the exhaust leg for heating the combustion air. The duct for transmitting the products of combustion to the air plenum may be upstream or downstream of the recuperator. Various forms of staged air or staged fuel may be used in conjunction with my assembly.

The method of reducing NOX formation in the radiant tube burner assembly includes directing a stream of high velocity combustion air axially through an air plenum to avoid swirl and aspirating products of combustion from an exhaust leg of the radiant tube so as to mix the products of combustion with the combustion air to form a mixture. Thereafter the mixture is further mixed with the fuel in a burner leg of a radiant tube and downstream of a flame stabilizing device to cause burning.

DESCRIPTION OF THE PREFERRED EMBODIMENTS

My radiant tube burner and assembly, generally designated 10, can be used in a variety of radiant tube fired furnaces. Representative examples of such furnaces are aluminum furnaces, air heaters, roller hearths, salt baths, lead baths, continuous annealers, wire annealers, enameling furnaces, batch annealers, glass furnaces, and the like.

Figure 1:
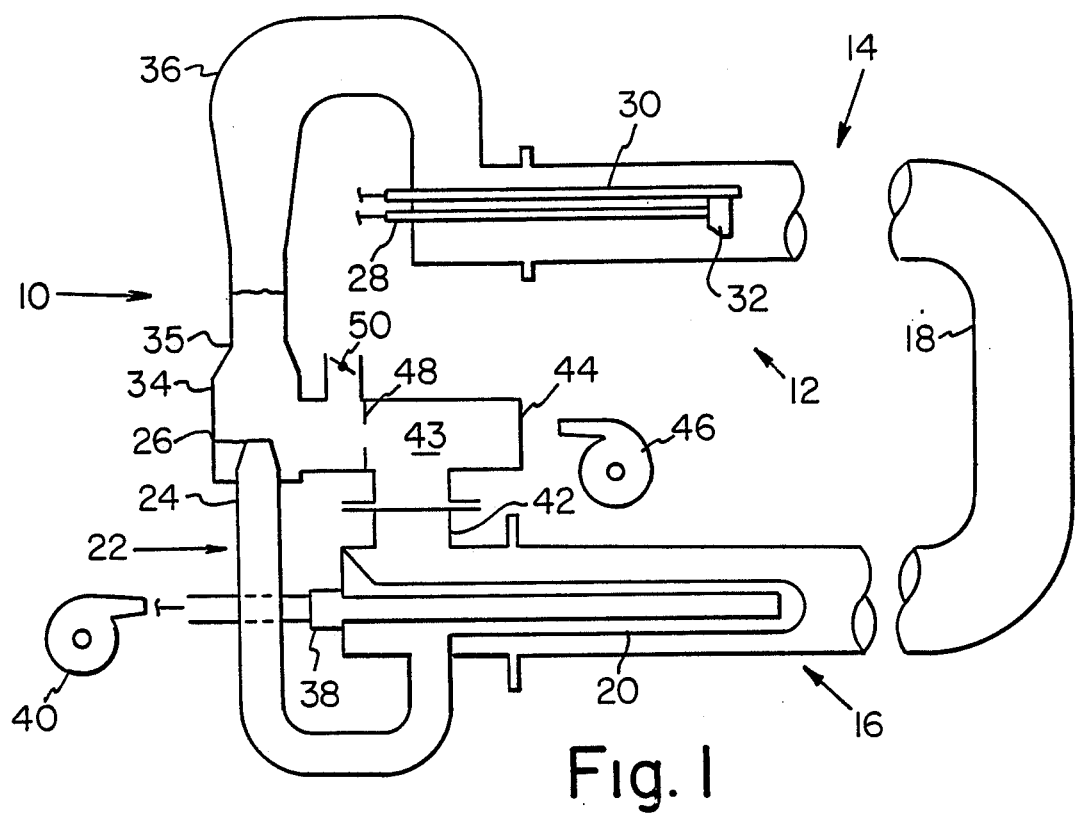
FIG. 1 is a schematic of my radiant tube and burner assembly including a recuperator in the exhaust leg.

The radiant tube burner and assembly 10 includes a radiant tube 12 which is illustrated as U-shaped, FIG. 1. It will be appreciated that my assembly is suitable for any tube shape and the specific configuration of the radiant tube does not form a part of this invention. The radiant tube 12 of FIG. 1 includes a burner leg 14 and an exhaust leg 16 joined by the curved connecting leg section 18. A recuperator 20 is positioned in the exhaust duct formed by the exhaust leg 16 to preheat the combustion air. A jet pump 22 provides the combustion air to the assembly 10.

Figure 4:
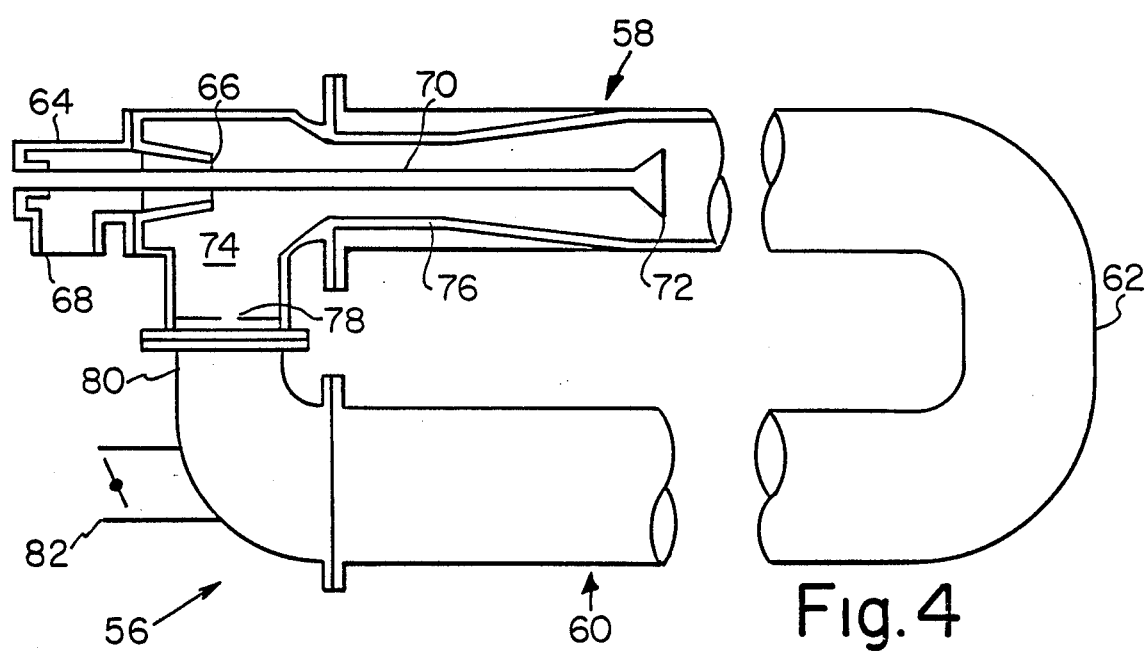
FIG. 4 is a further embodiment of a cold radiant tube and burner assembly.

The jet pump body 34 may be separate from the burner body as illustrated in FIG. 1 or can be a part of the burner body as illustrated in FIG. 4. A jet pump duct 24 is in registry with recuperator 20 through which combustion air is forced by fan 40. The heated combustion air exits axially through nozzle 26 of the jet pump 22. The air is at a pressure on the order of 1 lb./in$^2$.

An exhaust duct 42 exits the exhaust leg 16 at substantially its terminal end into exhaust chamber 43. Exhaust chamber 43 is generally T-shaped and terminates at one end in an exhaust opening 44 which is aided by exhaust fan 46 and terminates at the other end at a restricted orifice 48. It will be recognized that the system may not always need an exhaust fan to function properly. Upstream from the restricted orifice 48 is a cold air valve which is used for start up. Restricted orifice 48 is in communication with the exhaust chamber 43 and the jet pump body 34.

Jet pump body 34 includes a restricted section 35 which is in communication with plenum 36 which feeds into the burner leg 14 of the radiant tube 12.

A fuel tube 28 extends into the burner leg 14 and provides a fuel source (not shown) such as an oil or gaseous fuel. Ignition is initiated by a conventional ignitor 30, preferably a small capacity premix burning pilot. Fuel tube 28 terminates in a flame stabilizer 32. This stabilizer distributes the air uniformly about the gas stream while creating a partial vacuum between the two streams to promote stability.

In operation, the acceleration of the axially directed combustion air through nozzle 26 produces a negative region around the nozzle which is less than the absolute pressure in the exhaust chamber 43. The orifice 48 controls the quantity of recirculated products through its bore size. This orifice can be a fixed design or a multi-bladed bimetallic device that changes orifice area with product of combustion temperatures. The air duct 38 is connected to a suitable blower 40 to force the air through the system.

The valve 50 is necessary for cold start-up conditions to permit operating within the flamability limits of a gaseous or liquid fuel due to the products of combustion being recirculated. Since the jet pump, in accordance with fan laws will induce more pounds of products of combustion when the temperature is lower, the flamability limit could be exceeded when starting cold.

During normal operation it is desirable that the vitiated stream in plenum 36 be in the range of 16% to 18% oxygen on gaseous fuels and 14% to 18% oxygen on liquid fuels. The vitiated stream then meets with the fuel at flame stabilizer nozzle 32. The flame which is stabilized propagates through the tube completing combustion prior to entry over the recuperator 20. The flue gases are then further pushed or pulled across the recuperator through the duct 42 and out of the exhaust opening 44. When the exhaust at the exhaust opening 44 is communicated to a suction fan 46 the pressure at this outlet duct will be controlled by suitable means in proportion to the air and fuel firing rates to maintain an air flow/products of combustion flow through plenum 36 into the burner leg 14 and back across the recuperator 20 in the exhaust leg 16. Without this suitable control the combustion air issuing from the nozzle 26 would short circuit backwards through orifice 48 and through the exhaust opening 44.

Figure 2:
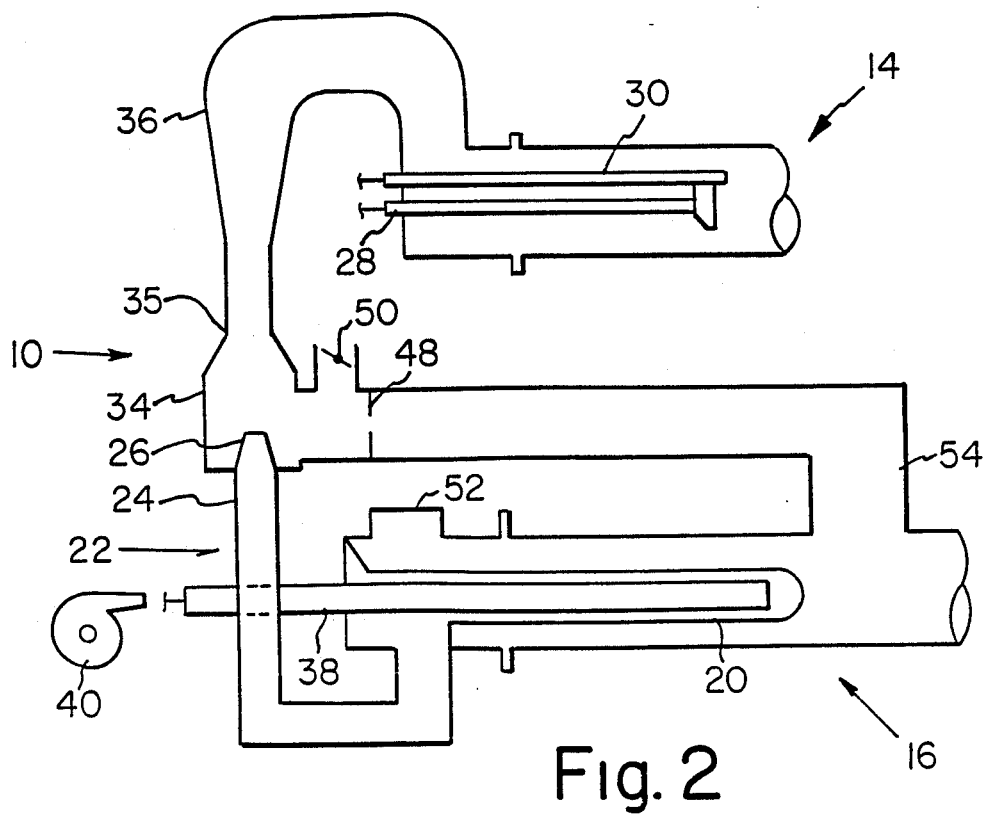
FIG. 2 is a schematic of the embodiment of FIG. 1 except the aspirated products of combustion exit the exhaust leg upstream of the recuperator.

The radiant tube burner and assembly 10 of FIG. 2 is virtually identical to that of FIG. 1 except that the products of combustion are exited ahead of the recuperator 20 through duct 54. This design minimizes the overall efficiency loss due to the recirculated products of combustion/recuperator capability. Neglecting ambient heat losses from jet pump 22 and air plenum 36 the assembly 10 of FIG. 2 operates under the same efficiency as with no recirculated products of combustion but with lower NOX emissions and improved tube temperature profile.

Figure 3:
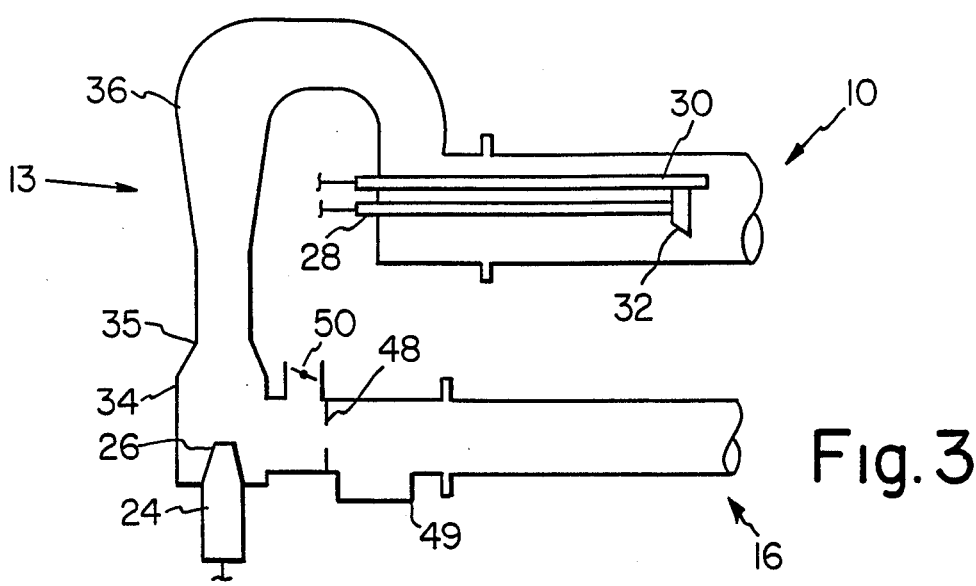
FIG. 3 is a schematic of a cold radiant tube and burner assembly arrangement.

The embodiment of FIG. 3 is similar to the embodiment of FIG. 1 except no recuperation is provided. In this embodiment the products of combustion either exit through exhaust outlet 49 or are aspirated through restricted orifice 48 positioned just downstream of exhaust leg 16. In this embodiment as in the other embodiments it is important that the forced air from jet pump duct 24 exit the jet pump nozzle 26 along the axial center line of the jet pump body 34 and the restricted section 35 which is in registry with plenum 36. Such an arrangement will avoid any swirling effect or Coanda effect and provide optimum operating conditions.

In FIG. 4 I have illustrated another form of my invention which also utilizes the operational characteristics of a radiant tube and an eductor coupled in series. The radiant tube and burner assembly 56 includes a burner leg 58, a curved connecting leg 62, and an exhaust leg 60. An exhaust duct 80 connects between the exhaust leg 60 and a plenum 74. A restricted orifice 78 in in registry between the plenum 74 and the duct 80 which also includes an exhaust 82. In this embodiment, the jet pump 64 receives combustion air through inlet 68 and directs that combustion air through nozzle 66 which is concentrically positioned about fuel tube 70 in the area of plenum 74. The aspirated products of combustion from exhaust duct 80 through orifice 78 and the combustion air mix in plenum 74 and are accelerated through restricted section 76 so as to mix with the fuel exiting flame stabilizer nozzle 72 in the burner leg 58. The assembly illustrated in FIG. 4 is a cold system with no recuperation of combustion air provided.

As the thermal input is reduced by process demands, the jet flow through nozzle 66 will diminish and the tube will become more effective, and the coupling characteristic between the eductor and tube becomes more efficient, thereby increasing the mass flow recirculated, consequently lowering the flame temperature, and increasing the mass flow disproportionately to the reduction in thermal input demand. This disproportionate increase in mass flow causes a further dilution of the oxidizing agent (air) and a reduction in flame luminosity to the extent that the typical "hot spot" is eliminated because of flame radiation minimized by these recirculating gases. The excess gases are discharged through port 82.

Figure 5:
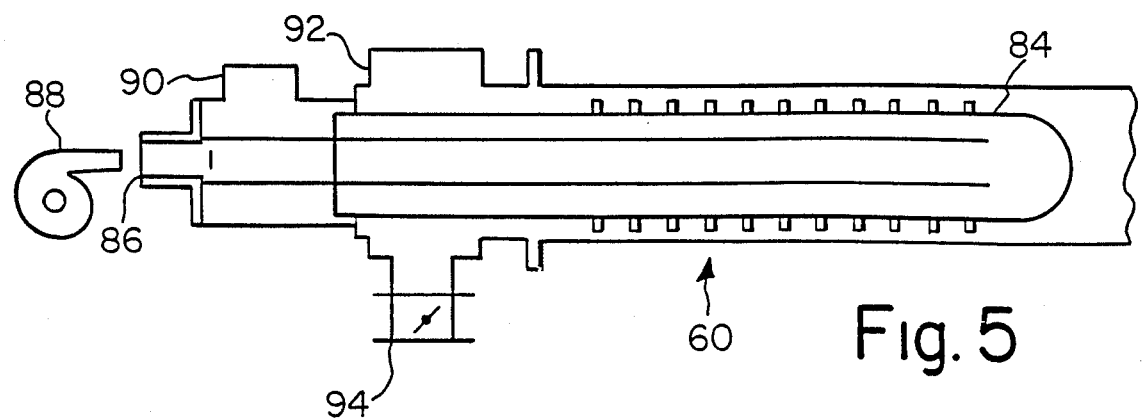
FIG. 5 is a schematic of a recuperator in an exhaust leg for use with the burner of FIG. 4.

A recuperator can be added to the cold system of FIG. 4. As illustrated in FIG. 5, recuperator 84 is positioned in the exhaust leg 60 and communicates with air duct 90 which feeds into the jet pump 64 of FIG. 4. The products of combustion either exit through exhaust opening 94 or are aspirated through duct 92 and a restricted nozzle (not shown). In this modification fan 88 directs the air through opening 86 in recuperator 84 to effectuate the operation of the jet pump 64.

With the jet pump 64 coupled to the recuperator 84 typically installed in the exhaust leg 60 of the radiant tube, the pattern is similar to that of FIG. 4 in that as the thermal input is reduced, the entering temperature to the recuperator drops, consequently the temperature in plenum 74 drops, and the natural characteristic of the eductor is to increase the mass flow causing an unbalance in the waste gas side versus air side and an increase in air temperature over that anticipated with balanced mass flow. This transient condition will equalize as the increased mass flow is increased (recirculation) and as the air preheat is increased, the velocity issuing from the jet too increases, thereby increasing the recirculated mass flow more than the cold air system previously described. The same effect is realized through the increased proportion of the recirculation gases causing a reduction of flame luminosity, thereby eliminating the hot spots, increasing the air preheat levels, and making the tube temperature profile more uniform.

Figure 6:
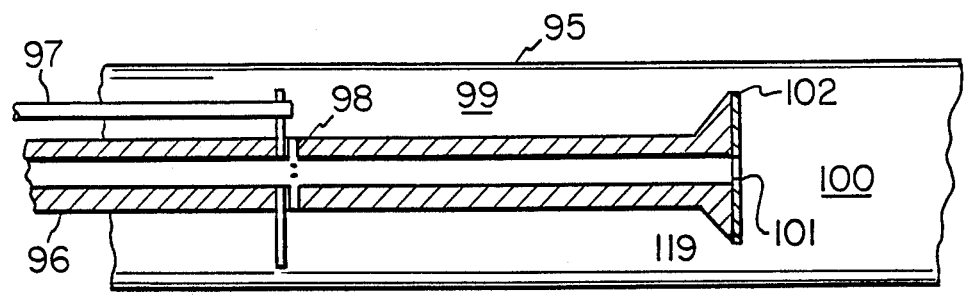
FIG. 6 is a schematic of a staged fuel burner.
Figure 7:
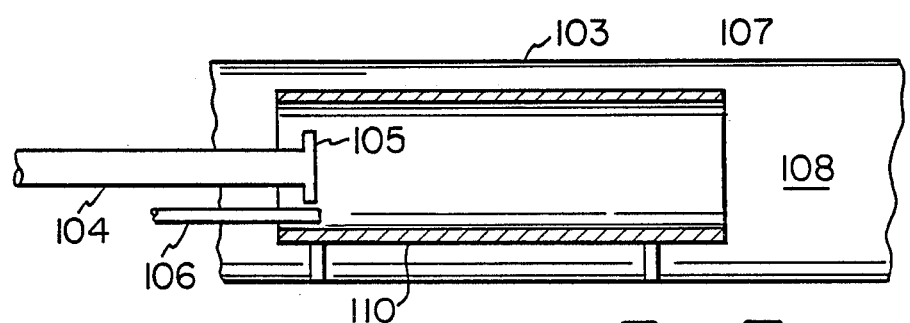
FIG. 7 is a schematic of a staged air burner.
Figure 8:
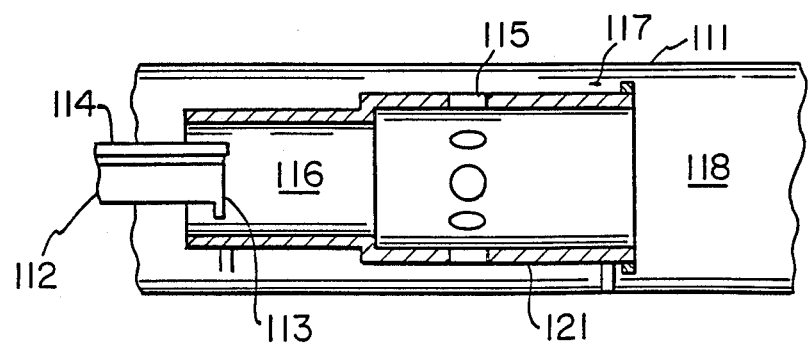
FIG. 8 is a schematic of a multi-staged air burner.

Staged combustion can also be employed to further reduce the NOX emissions as illustrated in FIGS. 6 through 8. FIG. 6 illustrates the configuration of a two staged fuel stage low NOX burner with the fuel being delivered through conduit 96 with approximately 50% issuing from a plurality of orifices 98 and the balance issuing from a single or plurality of orifices 101. A conventional ignitor 97 is provided. The total quantity of vitiated air is passed over the flame retention device 102 in the initial zone 99. The partially burned stream then propagates downstream to the flame retention device 102 with the partially burned flame mixture with excess oxygen passing through space 119 to meet the fuel exiting orifice 101. The flame then propagates and communicates through the tube to its exhaust.

FIG. 7 illustrates a two staged air staged combustor with the fuel communicating through duct 104 and exiting at an orifice in retention flange 105. Sleeve 107 defines an internal chamber 108 and forms an annulus 110 within burner leg 103. A standard ignitor 106 initiates combustion in chamber 108 through which about 50% of the combustion air passes. The remaining combustion air passes through annulus 110 where it meets downstream of nozzle 102 with the oxygen deficient products from chamber 108.

A multi-staged air staged combustion is illustrated in FIG. 8. Internal sleeve 121 defines a chamber 116 and an annulus 117 as in the embodiment of FIG. 7. However, a plurality of orifices 115 are provided intermediate the ends of sleeve 121 to continue the combustion process in a controlled manner thereby further minimizing flame temperature and development of NOX. Final combustion takes place in combustion zone 118.

A series of tests were carried out on an assembly similar to that illustrated in FIG. 1. Initially a blank plate was inserted between the jet pump and the flue gas duct so no products of combustion could be recirculated. The assembly was then operated under steady state conditions at a fuel input rate of 300,000 BTU/hr. with 2% $O_2$ and no combustibles. Various test measurements including NOX level leaving the assembly and temperature readings every 20 inches along the radiant tube were measured.

The blank plate was then removed and replaced by a butterfly valve to achieve the desired oxygen content. Again the assembly was operated at 300,000 BTU/hr., the oxygen content varied and the NOX level and hot spot above average (HSOA) measured.

Figure 9:
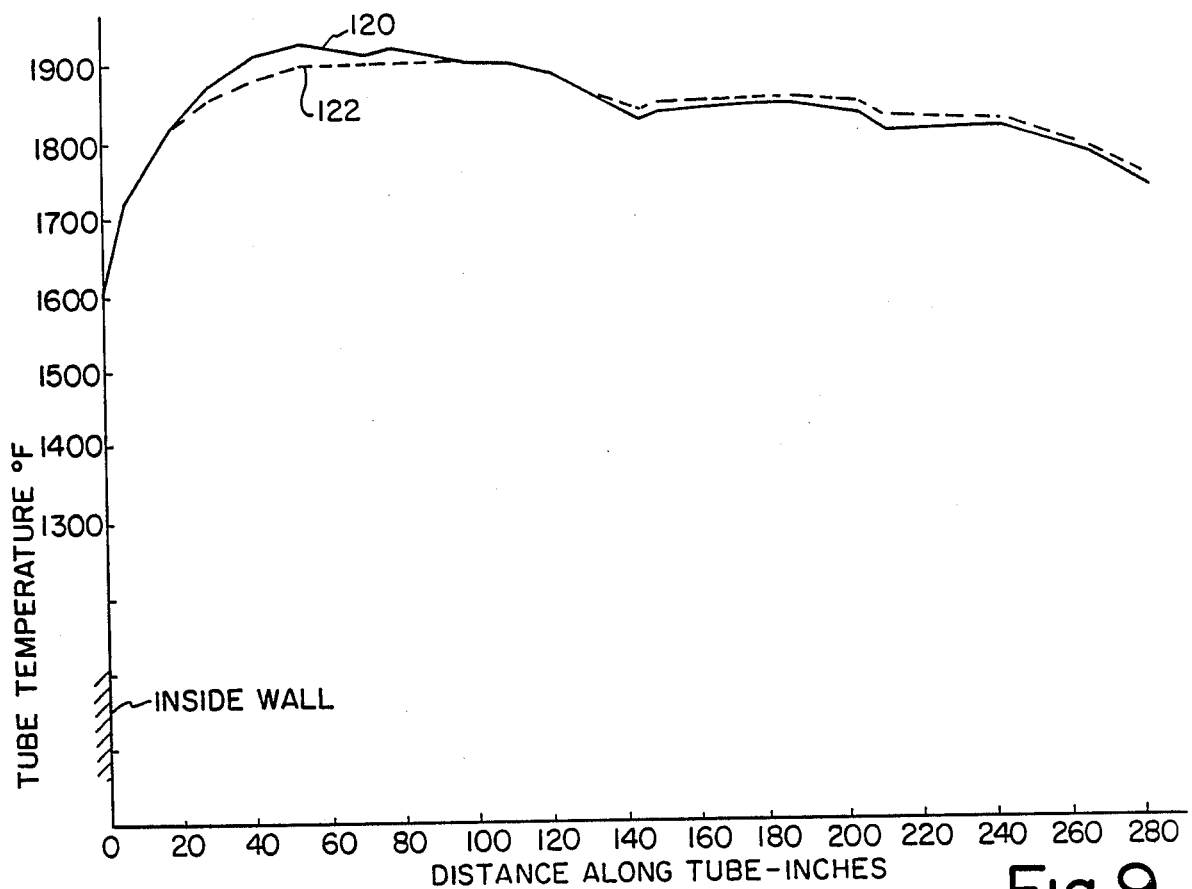
FIG. 9 is a graph showing temperature as measured along the radiant tube for a conventional assembly and for my assembly.
Figure 10:
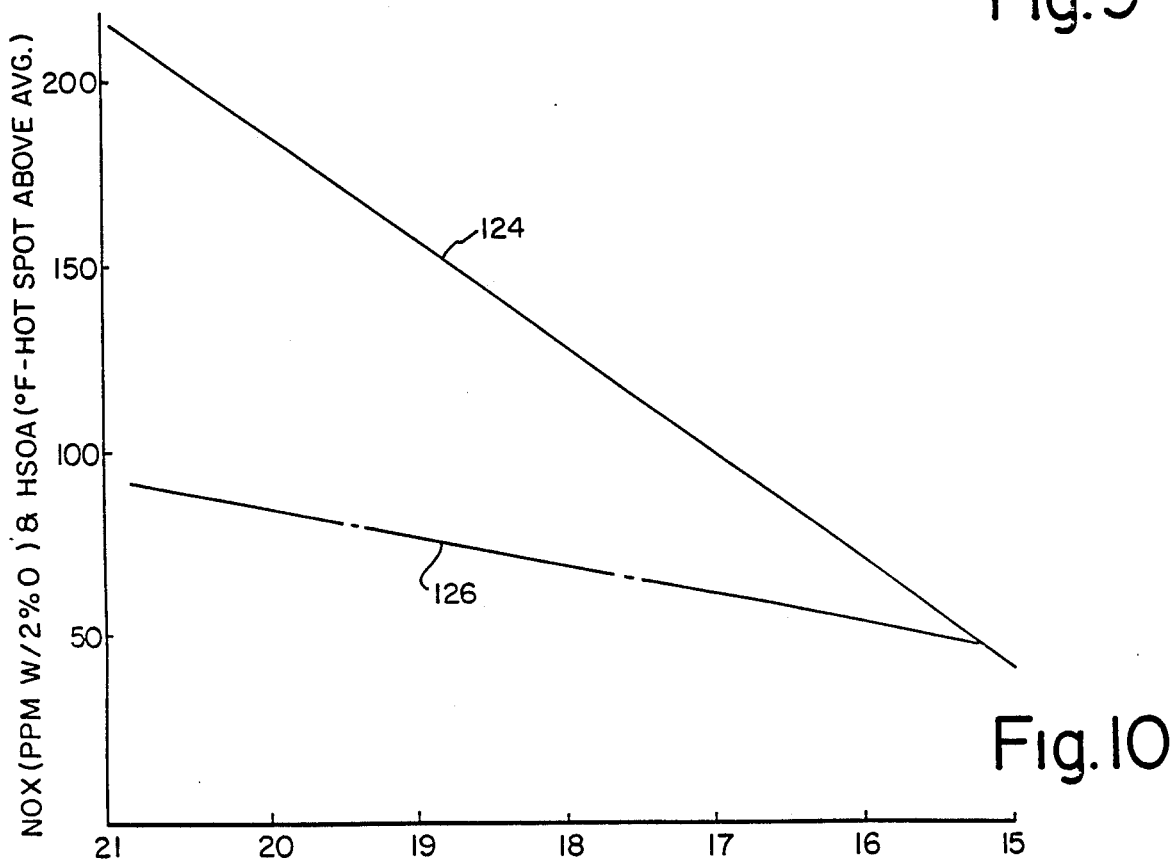
FIG. 10 is graph showing NOX emissions and tube temperatures as a function of oxygen percent.

The results are shown in FIGS. 9 and 10. In FIG. 9, the tube temperature curve 120 is shown for the system of FIG. 1 without any recirculated products of combustion and curve 122 illustrates the temperature along the radiant tube for recirculated products of combustion. It can be seen that there is a more uniform tube temperature for the radiant tube assembly of my invention.

FIG. 10 shows the effect of incresing the products of combustion and decreasing oxygen content on the NOX levels and the hot spot above average for the radiant tube. It can be seen that as the amount of recirculated products of combustion increase, the temperature profile of the tube improves, see curve 126. This curve 126 shows a more uniform heating as the products of combustion increase and the oxygen content decreases. In a similar manner, curve 124 shows a decrease in NOX emissions as the products of combustion increase. It can be seen that NOX levels are reduced from on the order of 200 PPM with no recirculated products of combustion to less than 100 PPM as the oxygen content is reduced to 17% and less through the addition of recirculated products of combustion.

Having thus described the invention in the detail and particularly required by the Patent Laws, what is desired protected by Letters Patent is set forth in the following claims.

I claim:

1. A radiant tube and burner assembly comprising:
   (a) a radiant tube having a burner leg and an exhaust leg;
   (b) a plenum positioned at least in part normal to and between the burner leg and the exhaust leg for mixing combustion air with at least a restricted quantity of products of combustion from the exhaust leg and for directing the resultant mixture into the burner leg;
   (c) a jet pump positioned upstream of said plenum for directing high velocity combustion air through a nozzle and along a central longitudinal axis of the plenum and for aspirating at least a restricted quantity of the products of combustion;
   (d) a duct in registry with the plenum and the exhaust leg for directing at least a restricted quantity of the products of combustion to the plenum;
   (e) a restricted orifice associated with the duct and dimensioned in side in relation to the jet pup nozzle to control the amount of products of combustion aspirated to the plenum;
   (f) exhaust means associated with the exhaust leg or duct and upstream of the plenum for exhausting the quantity of products of combustion not aspirated by the jet pump; and
   (g) a fuel source directed into the burner leg for providing fuel to mix with the combustion air and products of combustion;
   whereby all air intake is vitiated during normal operated and the fuel, combustion air and products of combustion provide a low temperature, uniform flame for reducing NOX emissions and providing uniform radiation along the radiant tube.

2. The radiant tube and burner assembly of claim 1 including a recuperator positioned in the exhaust leg for heating the combustion air.

3. The radiant tube and burner assembly of claim 2 wherein the duct is upstream of the recuperator.

4. The radiant tube and burner assembly of claim 1 wherein the fuel source includes a fuel tube directed into the burner leg and terminating in a flame stabilizer, said mixing the fuel with combustion air and products of combusion taking place around and downstream of the flame stabilizer.

5. The radiant tube and burner assembly of claim 1 wherein the exhaust means is associated with the duct upstream of the restricted orifice.

6. The radiant tube and burner assembly of claim 3 wherein the exhaust means is downstream of the duct and in the exhaust leg.

7. The radiant tube and burner assembly of claim 1 including a valve; downstream of(the restricted orifice in the duct for providing additional combustion air for cold start up.

8. The radiant tube and burner assembly of claim 4 wherein the jet pump directs the combustion air axially through a restricted throat area concentric to the fuel tube, said restricted throat terminating in a diverging section in the area of the flame stabilizer.

9. The radiant tube and burner assembly of claim 1, including a two stage fuel staged burner formed by a plurality of orifices in a fuel tube which are positioned upstream of the end of the fuel tube so that a portion of the fuel exits through the plurality of orifices and the balance exits a terminal end of the fuel tube.

10. The radiant tube and burner assembly of claim 1 including a multiple stage air staged burner formed by a sleeve concentrically positioned within the burner leg and surrounding and extending downstream of a fuel tube whereby a portion of the mixed combustion air and products of combustion pass through the sleeve and the balance pass through an annulus formed by the sleeve and the burner tube.

11. The radiant tube and burner assembly of claim 10 wherein said sleeve includes a plurality of orifices intermediate sleeve ends to provide additional combustion along the sleeve.

12. The radiant tube and burner assembly of claim 1 wherein said plenum includes a reduced section for receiving the combustion air and products of combustion, said section dimensioned in relation to the restricted orifice and jet pump nozzle to further control the mixture to the burner.

13. A method of reducing NOX formation in a radiant tube and burner assembly comprising:
    (a) directing a stream of high velocity combustion air from a jet pump axially through an air plenum to avoid swirl;
    (b) restricting a quantity of products of combustion flowing from an exhaust leg of the radiant tube by an orifice of the radiant tube;
    (c) aspirating the quantity of products of combustion circulated through the orifice by means of said combustion air;
    (d) exhausting through an exhaust means of the radiant tube the quantity of the products of combustion not aspirated;
    (e) mixing the quantity of products of combustion aspirated with said combustion air to form a mixture of from 14% to 18% oxygen and to vitiate all air intake during normal operation; and
    (f) mixing said mixture with a fuel in the burner leg of a radiant tube and downstream of a flame retention device to cause burning.

* * * * *

UNITED STATES PATENT AND TRADEMARK OFFICE
CERTIFICATE OF CORRECTION

PATENT NO. : 4,800,866

DATED : January 31, 1989

INVENTOR(S) : Harry P. Finke

It is certified that error appears in the above-identified patent and that said Letters Patent is hereby corrected as shown below:

Column 4 Line 12 "in" (first occurrence) should read --is--.

Claim 1 e) Column 6 Line 24 "side" should read --size--.

Claim 1 e) Column 6 Line 24 "pup" should read --pump--.

Claim 7 Column 6 Line 57 "valve; downstream of(the" should read --valve downstream of the--.

Signed and Sealed this

Tenth Day of October, 1989

Attest:

DONALD J. QUIGG

*Attesting Officer*  *Commissioner of Patents and Trademarks*